Dec. 2, 1952            A. H. ALLSOPP            2,619,980
MEANS FOR MAINTAINING KEROSENE OR OTHER LIQUID IN A
RESERVOIR AT AN APPROXIMATELY CONSTANT HEAD
Filed July 14, 1948

INVENTOR.
Arthur Henry Allsopp
BY
his ATTORNEY

Patented Dec. 2, 1952

2,619,980

UNITED STATES PATENT OFFICE 2,619,980

MEANS FOR MAINTAINING KEROSENE OR OTHER LIQUID IN A RESERVOIR AT AN APPROXIMATELY CONSTANT HEAD

Arthur Henry Allsopp, Melbourne, Victoria, Australia

Application July 14, 1948, Serial No. 38,724
In Australia July 25, 1947

2 Claims. (Cl. 137—406)

My invention relates to means for maintaining kerosene or other liquid, in a reservoir, at an approximately constant head and its objects are to provide a device in which firstly, the level of the liquid will be maintained approximately constant while the liquid is being consumed; secondly, the level of the liquid will not be affected by changes of temperature, and thirdly, the liquid is completely enclosed and thus in the case of inflammable liquid the risk of fire is minimised.

I attain these objects by the mechanism illustrated in the accompanying drawings, in which—

Figure 1:
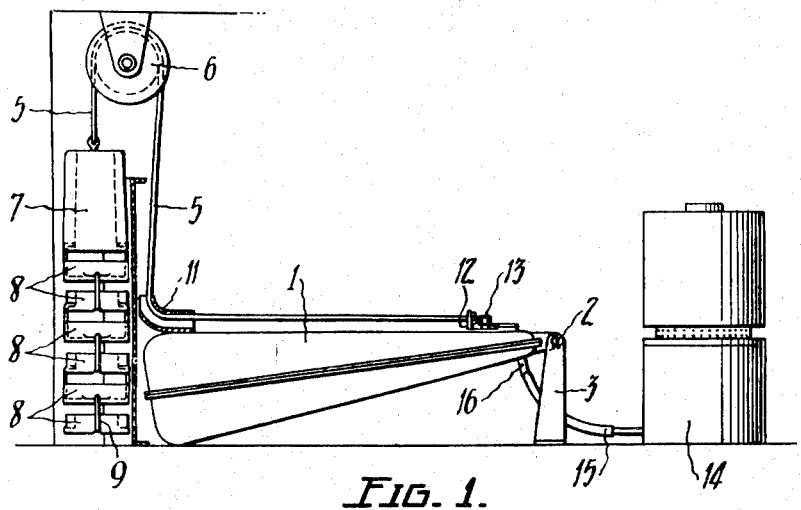
Figure 1 is an elevation of a constant level supply tank for a kerosene burner with the tank in its lowest position.
Figure 2:
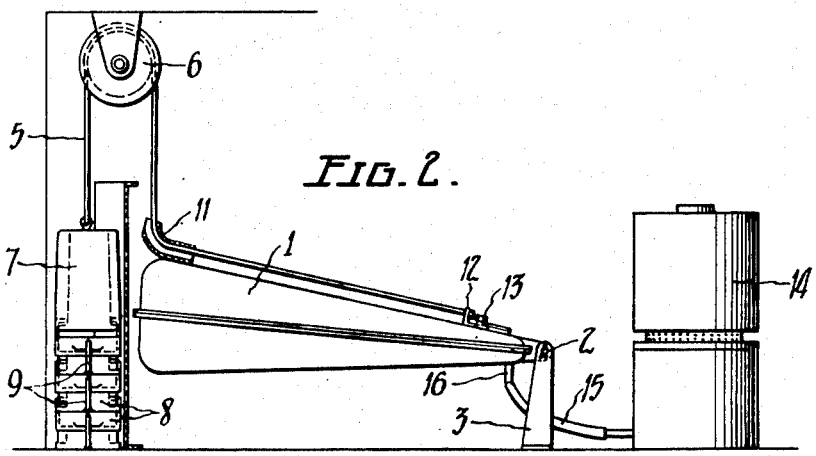
Figure 2 is an elevation of the device with the tank passing into its uppermost position.
Figure 3:
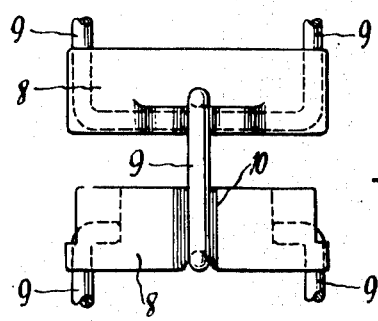
Figure 3 is an enlarged view of counter-weights forming portion of the device.

One end of the tank 1 is deeper than the other and the tank is pivoted at 2 to a fixed support 3. If adapted to hold about a gallon of kerosene it is approximately 15" long and 8½" wide. It is approximately 4" deep at its deeper end and tapers to about ¾" in depth at its shallower end. When the tank is full its deeper end rests upon the base of the fitting and its upper edge is horizontal. The tank is connected by a wire cable 5, passing over a pulley 6, to a counter-weight 7 which carries a series of supplementary counter-weights 8. Two adjacent supplementary counter-weights are shown in Figure 3. The supplementary counter-weights are connected together by pairs of hooks 9 which are adapted to slide in slots 10 in the edges of these counter-weights. The uppermost supplementary counter-weight is connected to the main counter-weight in the same way. The cable 5 passes down through a curved guideway 11, or through a pulley or the like (not shown), attached to the deeper end of the tank and then passes on to the shallower end of the tank to which it is attached adjustably by a slotted angle plate 12 and clamping screw 13 or the like. This attachment enables the cable and tank to be adjusted accurately when fitted or when the cable has altered in length after use, and it also enables the cable to be detached readily from the tank if it is necessary to remove the tank for cleaning or repair. The outflow from the tank to the kerosene burner 14 is by means of a flexible pipe 15 connected to an outflow tube 16 leading from the bottom of the shallower end of the tank. The flexible pipe may be formed of buna rubber or the like. When sufficient liquid has been removed from the tank to enable the composite counter-weight to function the tank is swung upwardly about its shallower end until the lowest supplementary weight engages the base of the fitting or other suitable stop so as to render that particular supplementary weight inoperative. The tank then remains in that position until a further predetermined quantity of liquid has been removed from the tank when the weights again swing the deeper end of the tank upwardly until the next supplementary weight rests upon the first supplementary weight or engages some other stop and thus limits, for the time being, the upward movement of the tank. The tank is thus swung upwardly about its shallower end step by step until the main weight eventually reaches the inoperative position. The supplementary counter-weights may be so selected that a fall of say ¼" in the level of the kerosene in the tank causes the weights to fall and the tank to swing upwardly until a supplementary weight is rendered inoperative and so on, step by step. The distance between the lowermost weight and the base of the fitting or other stop and the distance between adjacent weights in each case corresponds to the movement which is desired in the tank. The level of liquid is thus maintained approximately constant, thus providing an approximately constant head of liquid for the burner. Obviously, a visible indicator (not shown) can be attached readily to the outer portion of any movable part of the fitting so as to indicate the quantity of liquid in the reservoir.

Devices operating by float valves or on the inverted bottle principle are known for maintaining a constant level of liquid, but these devices have certain disadvantages or limitations as hereinafter explained. The type of device which is operated by a float valve is apt to leak, especially if any dirt or corrosion interferes with the close fitting of the valve upon its seat. Another type of device operates on the principle of an inverted bottle partly filled with liquid and with its neck depending into a shallow vessel of the liquid. It is sometimes known as the "bottle type" or "chicken bath" feed. Normally this type of device comprises a container which is connected at its lower end to an open topped vessel from which the liquid is to be drawn, the container being otherwise closed, so that the flow of liquid from the container is retarded by the reduction in pressure of the air above the liquid. This "bottle type" or "chicken bath" feed has the objection that the level of the liquid in the open topped vessel is affected by the expansion and contraction of the air in the container under change of temperature. In relation to the supply of kerosene to a burner this type also has the very great objection that the second vessel is open topped. There is thus a danger of kerosene being spilt over the fitting and possibly causing a fire. Similarly, with float-operated valves, the leakage that occurs may be dangerous. Even apart from the question of danger, the leakage of kerosene causes an objectionable smell.

Furthermore, with both of these known types of control it is impracticable to devise any simple form of indicator to show the level of the liquid in the tank, especially as any indicator such as a glass tube is apt to be broken.

These difficulties have been overcome by the improved means hereinbefore described.

I claim:

1. A fuel feeding system for gravity feed of liquid fuel to a consumer comprising a tank providing a reservoir for fuel, said tank being deeper at one end than at the other, a pivotal support for said tank adjacent to its shallower end, a series of counter-weights, slidable members connecting adjacent counter-weights, a cable attached to the uppermost counter-weight, a pulley over which said cable passes, a curved guideway for said cable on the deeper end of said tank, and means adapted to limit the downward movement of individual counter-weights in sequence.

2. A fuel feeding system for gravity feed of liquid fuel to a consumer comprising a tank providing a reservoir for fuel, said tank being deeper at one end than at the other, a pivotal support for said tank adjacent to its shallower end, a series of counter-weights, slidable members connecting adjacent counter-weights, means adapted to limit the downward movement of individual counter-weights in sequence, a flexible element attached at one end of the uppermost counter-weight, a pulley over which said element passes, a guide for said element at the deeper end of the tank and adjustable means for connecting said element to said tank at a place between said guide and said pivotal support.

ARTHUR HENRY ALLSOPP.

REFERENCES CITED

The following references are of record in the file of this patent:

UNITED STATES PATENTS

| Number | Name | Date |
| --- | --- | --- |
| 820,376 | Wilder | May 8, 1906 |
| 990,153 | Miller | Apr. 18, 1911 |
| 1,173,475 | Anderson | Feb. 29, 1916 |
| 1,180,481 | Eames | Apr. 25, 1916 |
| 1,641,612 | Atkins | Sept. 6, 1927 |
| 2,281,444 | Julin | Apr. 28, 1942 |
| 2,407,216 | Ball | Sept. 10, 1946 |

UNITED STATES PATENTS

| Number | Name | Date |
| --- | --- | --- |
| 145 | Great Britain | 1911 |
| 476,903 | Germany | 1929 |